(12) United States Patent
Hansen et al.

(10) Patent No.: US 10,325,168 B2
(45) Date of Patent: Jun. 18, 2019

(54) FINGERPRINT SENSING SYSTEM CONFIGURED TO DETERMINE IF A FINGER CONTACTS A FINGERPRINT SENSOR

(71) Applicant: Fingerprint Cards AB, Göteborg (SE)

(72) Inventors: Morten Hansen, Hellerup (DK); Morten With Pedersen, Frederiksberg (DK)

(73) Assignee: Fingerprint Cards AB, Gothenburg (SE)

( * ) Notice: Subject to any disclaimer, the term of this patent is extended or adjusted under 35 U.S.C. 154(b) by 89 days.

(21) Appl. No.: 15/807,777

(22) Filed: Nov. 9, 2017

(65) Prior Publication Data

US 2018/0173978 A1    Jun. 21, 2018

(30) Foreign Application Priority Data

Dec. 20, 2016  (SE) .................................... 16516841

(51) Int. Cl.
*G06K 9/00* (2006.01)
*G06K 9/03* (2006.01)
(Continued)

(52) U.S. Cl.
CPC ......... *G06K 9/00899* (2013.01); *G06F 21/32* (2013.01); *G06K 9/00013* (2013.01);
(Continued)

(58) Field of Classification Search
None
See application file for complete search history.

(56) References Cited

U.S. PATENT DOCUMENTS

| 8,437,513 B1* | 5/2013 | Derakhshani | G06K 9/00597 |
| | | | 382/115 |
| 2010/0172567 A1* | 7/2010 | Prokoski | A61B 5/0064 |
| | | | 382/132 |

(Continued)

FOREIGN PATENT DOCUMENTS

WO    2016049655 A1    3/2016

OTHER PUBLICATIONS

Syarif et al, Enhanced maximum curvature descriptors for finger vein verification, Multimed Tools Appl (2017) 76:6859-6887 (Year: 2017).*

(Continued)

*Primary Examiner* — Andrae S Allison
(74) *Attorney, Agent, or Firm* — RMCK Law Group, PLC (57) ABSTRACT

The invention relates to a method performed by a fingerprint sensing system of determining if a finger contacts a fingerprint sensor of the system, and a fingerprint sensing system performing method. In a first aspect of the invention, a method performed by a fingerprint sensing system is provided for determining if a finger contacts a fingerprint sensor of the fingerprint sensing system. The method comprises capturing an image of an object contacting the fingerprint sensor, determining an intensity for a plurality of pixels of the captured image, estimating local curvatures of pixel intensity variation in the captured image, and determining from the estimated local curvatures if local pixel intensity variation is dominated by a single direction, in which case the object on the sensor is considered to constitute a finger.

20 Claims, 6 Drawing Sheets

(51) Int. Cl.
*G06K 9/44* (2006.01)
*G06K 9/46* (2006.01)
*G06K 9/80* (2006.01)
*G06F 21/32* (2013.01)

(52) U.S. Cl.
CPC ...... *G06K 9/00087* (2013.01); *G06K 9/00114* (2013.01); *G06K 9/036* (2013.01); *G06K 9/44* (2013.01); *G06K 9/4604* (2013.01); *G06K 9/4647* (2013.01); *G06K 9/80* (2013.01)

(56) References Cited

U.S. PATENT DOCUMENTS

| | | | | |
|---|---|---|---|---|
| 2011/0212717 | A1* | 9/2011 | Rhoads | G06K 9/00664 455/420 |
| 2012/0063300 | A1* | 3/2012 | Sahin | H04W 36/12 370/225 |
| 2014/0044320 | A1* | 2/2014 | Derakhshani | G06K 9/0061 382/117 |
| 2014/0119593 | A1* | 5/2014 | Filler | G06T 1/0064 382/100 |
| 2016/0063300 | A1* | 3/2016 | Du | G06K 9/00033 382/124 |
| 2016/0210493 | A1* | 7/2016 | Walch | G06K 9/00013 |
| 2018/0025199 | A1* | 1/2018 | Ryshtun | G06K 9/0002 382/125 |
| 2018/0068435 | A1* | 3/2018 | Noack | G06T 7/0012 |

OTHER PUBLICATIONS

Miura et al, Extraction of Finger-Vein Patterns Using Maximum Curvature Points in Image Profiles, MVA2005 IAPR Conference on Machine Vision Applications, May 16-18, 2005 Tsukuba Science City, Japan (Year: 2005).*

Choi, Joon Hwan, et al. "Finger vein extraction using gradient normalization and principal curvature." Image Processing: Machine Vision Applications II. vol. 7251. International Society for Optics and Photonics, 2009. (Year: 2009).*

Akl, A. et al., "Second-moment matrix adaptation for local orientation estimation", 2016 International Conference on Systems, Signals and Image Processing (IWSSIP), Bratislava, 2016, pp. 1-4.

Swedish Search Report for Swedish Application No. 1651684-1 dated Jul. 3, 2017, 2 pages.

Xie, S. et al., "Improved Hessian Curvature for Fingerprint Analysis", International Journal of Advanced Research in Computer and Communication Engineering, vol. 5, Issue 6, Jun. 2016, pp. 568-573.

* cited by examiner

FINGERPRINT SENSING SYSTEM CONFIGURED TO DETERMINE IF A FINGER CONTACTS A FINGERPRINT SENSOR

CROSS REFERENCE TO RELATED APPLICATIONS

This application claims priority to Sweden Application No. 1651684-1, filed on Dec. 20, 2016, the disclosure of which is incorporated herein by reference in its entirety.

TECHNICAL FIELD

The invention relates to a method performed by a fingerprint sensing system of determining if a finger contacts a fingerprint sensor of the system, and a fingerprint sensing system performing method.

BACKGROUND

Electronic devices such as smart phones, laptops, remote controls, tablets, smart cards, etc., uses fingerprint recognition e.g. to allow a user to access the device, to authorize transactions carried out using the electronic device, or to authorize the user for accessing a service via the electronic device. Hence, the electronic device is equipped with a fingerprint sensor on which the user places her finger in order for the sensor to capture an image of the fingerprint and compare the recorded fingerprint with a pre-stored, authenticated fingerprint template. If the recorded fingerprint matches the pre-stored template, the user is authenticated and the smart phone will perform an appropriate action, such as transitioning from locked mode to unlocked mode, in which the user is allowed access to the smart phone.

Now, for fingerprint sensors which do not require to be physically pressed in order to be activated—i.e. the sensor is activated when the sensor detects that an object is touching the sensor—various objects may unintendedly activate the fingerprint sensor.

This has the unfortunate effect that if the user is carrying the phone in e.g. a pocket or in a bag along with other items, the sensor may be activated by objects other than a finger touching the fingerprint sensor, e.g. cloth from the pocket/bag or other items therein such as coins, keys, wallets, etc.

This unintended activation of the fingerprint sensor may for example have as a consequence that the phone vibrates in the pocket/bag, that the battery is drained from power more quickly due to the attempts to match the captured pocket/bag item images to fingerprint templates, and/or that the phone sets the fingerprint sensor in a locked mode (due to too many failed activations), requiring the user to enter a backup pin code when the phone is retrieved from the pocket/bag and the user wants to activate it.

There is thus a need in the art to determine whether an object contacting the fingerprint sensor is a finger or not.

SUMMARY

An object of the present invention is to solve, or at least mitigate, this problem in the art and thus to provide an improved method of determining if a finger contacts a fingerprint sensor.

This object is attained in a first aspect of the invention by a method performed by a fingerprint sensing system of determining if a finger contacts a fingerprint sensor of the fingerprint sensing system. The method comprises capturing an image of an object contacting the fingerprint sensor, determining an intensity for a plurality of pixels of the captured image, estimating local curvatures of pixel intensity variation in the captured image, and determining from the estimated local curvatures if local pixel intensity variation is dominated by a single direction, in which case the object on the sensor is considered to constitute a finger.

This object is attained in a second aspect of the invention by a fingerprint sensing system comprising a fingerprint sensor and a processing unit, the fingerprint sensing system being configured to determine if a finger contacts the fingerprint sensor of the fingerprint sensing system. The fingerprint sensor is configured to capture an image of an object contacting the fingerprint sensor. The processing unit is configured to determine an intensity for a plurality of pixels of the captured image, estimate local curvatures of pixel intensity variation in the captured image, and determine from the estimated local curvatures if local pixel intensity variation is dominated by a single direction, in which case the object on the fingerprint sensor is considered to constitute a finger.

Hence, the fingerprint sensor captures an image of an object contacting the sensor, and the processing unit determines from the captured image an intensity for a plurality of pixels of the captured image and estimates local curvatures of pixel intensity variation in the captured image.

Variation in pixel intensity of a captured image of a fingerprint is substantial when comparing the intensity of a pixel representing a ridge (where the pixel is black) with the intensity of a neighbouring pixel representing a valley (where the pixel is white). The variation in pixel intensity is thus at its maximum when transitioning from a ridge to a valley, or from a valley to a ridge, whereas when comparing two pixels both representing a ridge (or both representing a valley), the difference in pixel intensity is very small.

Further, the processing unit determines from the estimated local curvatures whether local pixel intensity variation is dominated by a single direction, in which case the object on the sensor is considered to constitute a finger.

The captured image is dominated by pixels where the intensity variation around the pixel is low in the direction of the ridge or valley to which the pixel belongs, while the intensity variation is high in a direction perpendicular to the ridge-valley orientation.

For a captured image of for instance a piece of fabric or cloth, local variations in pixel intensity are relatively small, and pixel intensity variation does not indicate any particular direction. The local curvature of the pixel intensity is in such case said to be isotropical or circular, i.e. there is little or no evidence of a fingerprint ridge or valley around a pixel, a characteristic of many non-fingerprint images.

Advantageously, as can be concluded from the above, the method and system of the invention is capable of determining whether an object contacting the fingerprint sensor indeed is a finger or not.

In an embodiment, the estimating of the local curvatures of the pixel intensity is performed by computing the so called Hessian matrix with second-order derivatives of the pixel intensities, calculated at each pixel.

In yet an embodiment, the components of the Hessian matrix are computed by convolving the captured image with a first filter in an x-direction, convolving the captured image with a second filter in a y-direction, and convolving the captured image with a third filter in the x-direction and then convolving the result of the convolution with the third filter with a fourth filter in the y-direction.

In still an embodiment, the square of the Hessian matrix is computed.

In still another embodiment, trace and determinant of the Hessian matrix is computed to derive properties of its eigenvalues $\lambda_1$ and $\lambda_2$.

In yet another embodiment a Fractional Anisotropy (FA) measure is computed using eigenvalues of the computed Hessian matrix. From the Hessian matrix computed in each pixel, two eigenvalues $\lambda_1$ and $\lambda_2$ are derived and these two eigenvalues are used to compute the square of the so called FA measure:

$$FA^2 = \frac{(\lambda_1 - \lambda_2)^2}{\lambda_1^2 + \lambda_2^2},$$

in order to advantageously determine whether local pixel intensity variation is dominated by a single direction.

In yet a further embodiment, a fingerprint qualification score (FQS) is calculated as a linear combination of all the FA measure values for said plurality of pixels normalized by the number of said plurality of pixels.

For convenience, the FQS can be scaled. The FQS is thus computed as the scaled (e.g. by 100) average of the FA measure across all pixels in the captured image:

$$FQS = \frac{100}{N_x \cdot N_y} \cdot \sum_{xy} FA_{xy}^2,$$

In still an embodiment, the FQS is advantageously compared to a threshold value, wherein the local pixel intensity variation is considered to be dominated by a single direction if the fingerprint qualification score exceeds the threshold value.

In still a further embodiment the captured image is downsampled. If e.g. the image is downsampled by a factor 2, the amount of pixels for which the FA measure must be calculated is advantageously reduced to ¼, drastically reducing the complexity.

In yet further embodiments, the captured image is filtered by a smoothing filter, and/or each component of the square of the Hessian matrix is filtered using smoothing filtering.

In yet an embodiment, a fingerprint of the captured image of the finger is compared with one or more authorised pre-stored fingerprint templates contained in a memory of the fingerprint sensing system, wherein a user to which the finger belongs is authenticated if the fingerprint of the captured image is considered to match one or more of the authorised pre-stored fingerprint templates.

In a third aspect of the invention, an electronic device is provided comprising the disclosed fingerprint sensing system, which electronic device is configured to perform at least one action upon authentication of the user. The electronic device may be embodied in the form of a smart phone, a laptop, a remote control, a tablet, a smart card, etc.

In a fourth aspect of the invention, a computer program is provided comprising computer-executable instructions for causing the fingerprint sensing system to perform steps recited in any one of the method claims when the computer-executable instructions are executed on a processing unit included in the fingerprint sensing system.

In a fifth aspect of the invention, an electronic device is provided comprising a computer program product comprising a computer readable medium, the computer readable medium having the computer program of the fourth aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
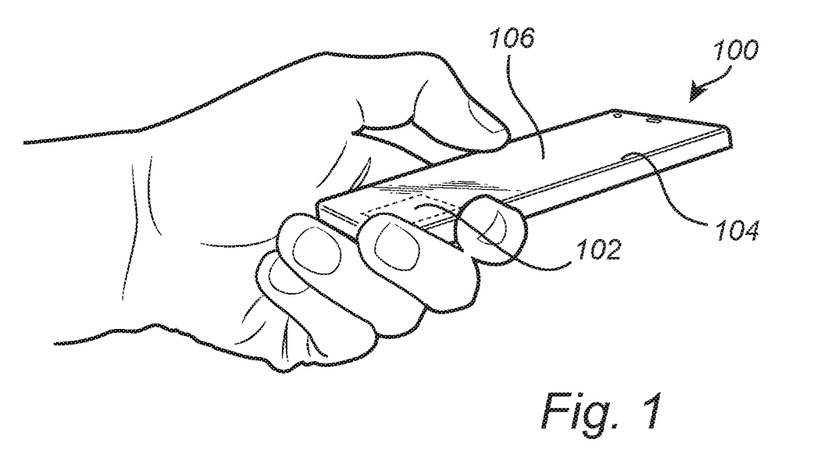
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or any other type of present or future similarly configured device requiring fingerprint sensing.

Figure 2:
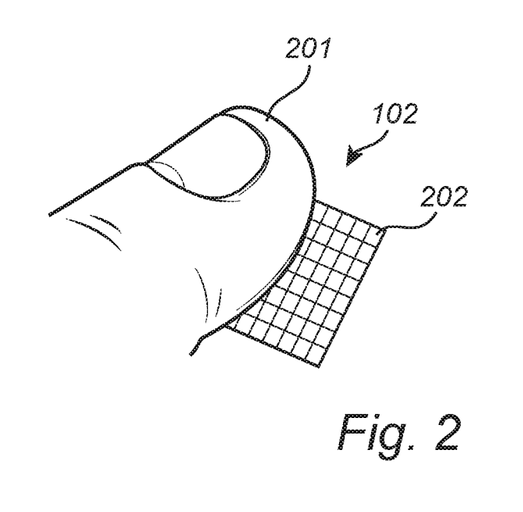
FIG. 2 shows a view of a fingerprint sensor onto which a user places her finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
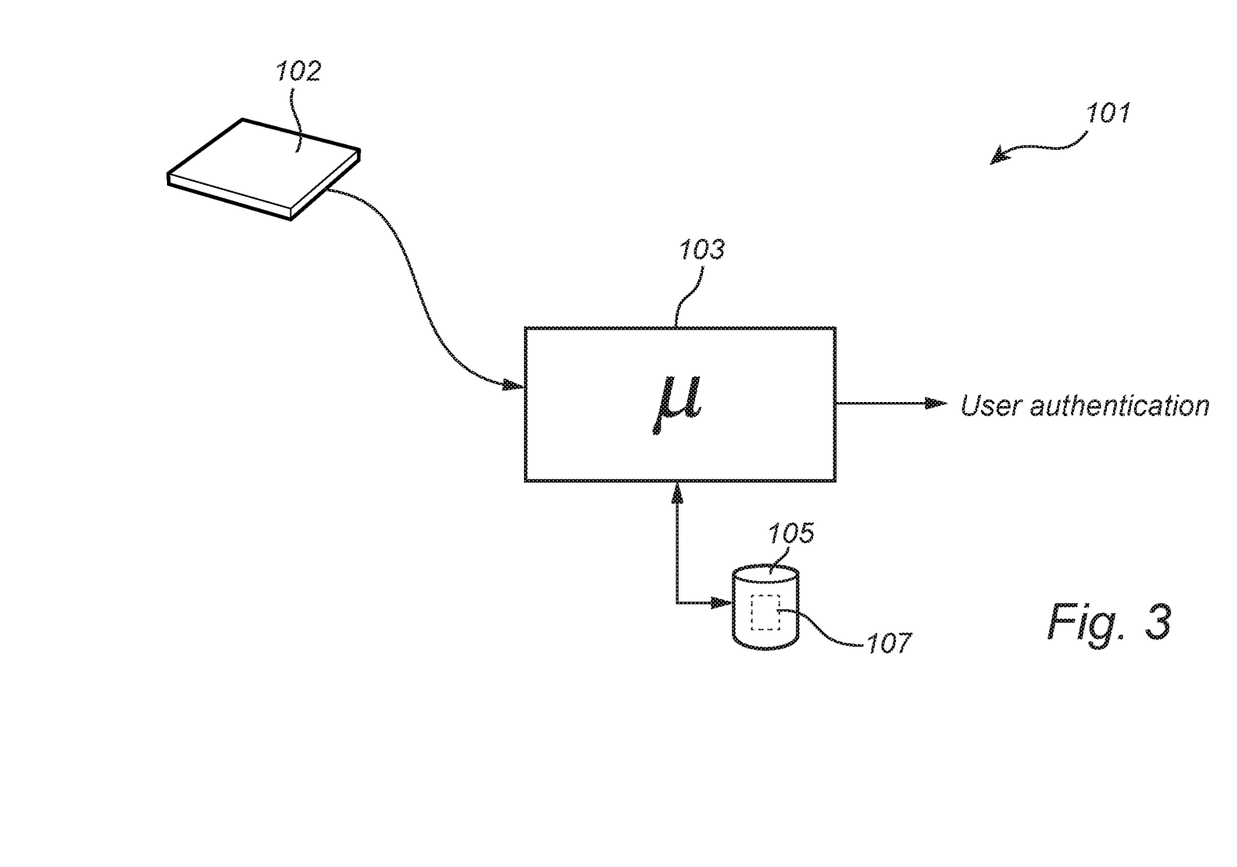
FIG. 3 shows a fingerprint sensor being part of a fingerprint sensor system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

As previously has been discussed, since the fingerprint sensing system 101 may be activated upon contact with an object, it is desirable to determine whether the object is a finger 201 or not, for instance in order to prevent the processing unit 103 from starting a process of performing fingerprint template matching, thereby avoiding unnecessary battery drainage.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4A:
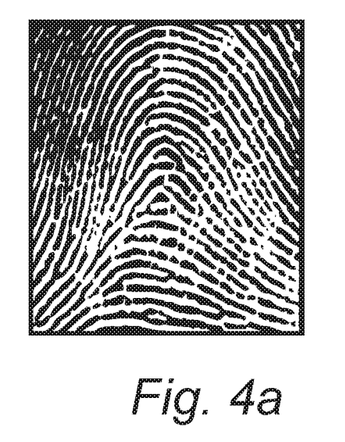
FIGS. 4a and 4b show a captured image of a fingerprint and fabric/cloth, respectively.
Figure 4B:
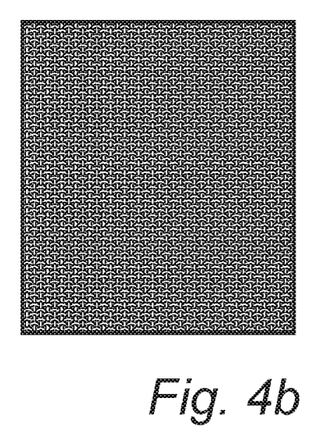

FIGS. 4a and 4b show an image of a fingerprint and fabric/cloth, respectively.

Figure 5:
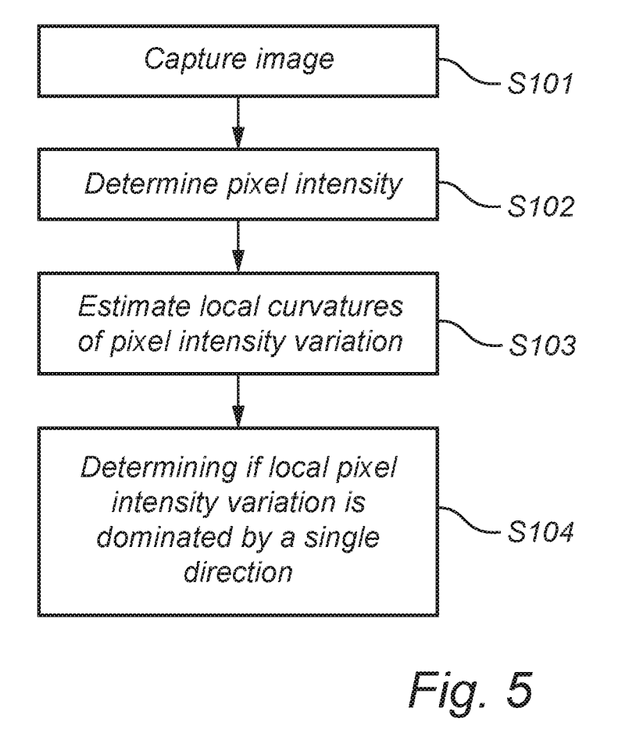
FIG. 5 shows a flowchart illustrating a method of determining if a finger contacts the fingerprint sensor according to an embodiment.

FIG. 5 shows a flowchart illustrating a method of determining whether or not it is a finger that contacts the fingerprint sensor according to an embodiment.

In a first step S101, the fingerprint sensor 102 captures an image of an object contacting the sensor 102.

In a second step S102, the processing unit 103 determines, from the captured image, an intensity for a plurality of pixels of the captured image and, in step S103, estimates local curvatures of pixel intensity variation in the captured image. Local curvatures could in this context imply curvatures around each pixel or alternatively that the image is divided into smaller groups of pixels and the local curvatures are then curvatures in and around each of these groups of pixels.

With reference to FIG. 4a, it can be concluded that the variation in pixel intensity of a captured image of a fingerprint is substantial when comparing the intensity of a pixel representing a ridge (where the pixel is black) with the intensity of a neighbouring pixel representing a valley (where the pixel is white).

The variation in pixel intensity is thus at its maximum when transitioning from a ridge to a valley, or from a valley to a ridge, whereas when comparing two pixels both representing a ridge (or both representing a valley), the difference in pixel intensity is very small.

Further, in step S104, the processing unit 103 determines from the estimated local curvatures whether local pixel intensity variation is dominated by a single direction, in which case the object on the sensor is considered to constitute a finger.

Hence, with reference to the fingerprint image in FIG. 4a, it can be concluded that the image is dominated by pixels where the intensity variation around the pixel is low in the direction of the ridge or valley to which the pixel belongs, while the intensity variation is high in a direction perpendicular to the ridge-valley orientation.

Turning to FIG. 4b, showing a captured image of a piece of fabric or cloth, it can be concluded that local variations in pixel intensity are relatively small, and further that pixel intensity variation does not indicate any particular direction. The local curvature of the pixel intensity is in such case said to be isotropical or circular, i.e. there is little or no evidence of a fingerprint ridge or valley around a pixel, a characteristic of many non-fingerprint images.

In an embodiment, step S103 of estimating the local curvature of the pixel intensity is performed by computing the so called Hessian matrix with second-order derivatives of the pixel intensities, calculated at each pixel.

From the Hessian matrix H computed in each pixel, two eigenvalues $\lambda_1$ and $\lambda_2$ are derived and, in another embodiment to be described later in the below, these two eigenvalues are used to compute the square of the so called Fractional Anisotropy (FA) measure:

$$FA^2 = \frac{(\lambda_1 - \lambda_2)^2}{\lambda_1^2 + \lambda_2^2},$$

in order to determine whether local pixel intensity variation is dominated by a single direction—as previously was described with reference to step S104 of FIG. 5—which is considered as evidence that the pixel is part of a ridge or valley in a fingerprint image.

In the approach used in the invention, so called saddle points (where the two eigenvalues $\lambda_1$ and $\lambda_2$ have different signs) are disregarded, which has as a result that the FA measure evaluates to a scalar between 0 and 1.

If the FA measure is zero, the eigenvalues have the same magnitude, i.e. the local curvature of the pixel intensity is isotropical/circular which is considered as evidence that the pixel is most likely not part of a fingerprint image.

To the contrary, if the FA measure is close to one, one eigenvalue is much larger than the other, i.e. the local pixel intensity variation is dominated by a single direction, which is considered as strong evidence that the pixel is part of a ridge or valley in a fingerprint image.

The FA measure may be regularized by a scalar parameter $\varepsilon$ in order to prevent numerical problems (division by a value close to zero) in regions with small eigenvalues:

$$FA^2 = \frac{(\lambda_1 - \lambda_2)^2}{\lambda_1^2 + \lambda_2^2 + \varepsilon}$$

In an embodiment, it is envisaged that the FA measure for each pixel is compared to one or more threshold values for determining whether a fingerprint has been captured. Alternatively, a fingerprint qualification score (FQS) is computed.

Returning to the computation of the Hessian matrix H; components $I_{xx}$, $I_{yy}$ and $I_{xy}$ of the Hessian matrix H are calculated in each pixel of the captured image, where $$H = \begin{bmatrix} I_{xx} & I_{xy} \\ I_{xy} & I_{yy} \end{bmatrix}$$

$I_{xx}$ is the second-order derivative of the pixel intensity for each pixel in the (horizontal) x-direction, $I_{yy}$ is the second-order derivative in the (vertical) y-direction and $I_{xy}$ are the second-order cross-derivatives in the x- and y-direction. All derivatives are calculated by finite difference methods, using filters of e.g. length 3. Other filter lengths can be envisaged.

It should be noted that the method of the invention could be configured to operate on a subset of pixels in the image, but the best result would generally be attained when operating on all, or close to all, pixels of the captured image.

$I_{xx}$ values are calculated by convolving the captured image in the x-direction by the filter:

$$F_{xx} = [1\ -2\ 1]$$

$I_{yy}$ values are calculated by convolving the captured image in the y-direction by the filter:

$$F_{yy} = \begin{bmatrix} 1 \\ -2 \\ 1 \end{bmatrix}$$

$I_{xy}$ values are calculated by convolving the captured image by the 3×3 kernel filter:

$$F_{xy} = \frac{1}{4}\begin{bmatrix} 1 & 0 & -1 \\ 0 & 0 & 0 \\ 1 & 0 & -1 \end{bmatrix} = \frac{1}{4} \cdot \begin{bmatrix} 1 \\ 0 \\ -1 \end{bmatrix} \cdot [1\ 0\ -1]$$

In other words, $I_{xy}$ values are calculated by first convolving with the filter [1 0 −1] in the horizontal x-direction and then convolving the result with the filter ¼·[1 0 −1]$^T$ in the vertical y-direction.

In an embodiment, in order to advantageously assist in the subsequent calculation of the FA measure the square of the Hessian matrix, i.e. the inner product of the Hessian, is computed.

$$H^2 = H \cdot H = \begin{bmatrix} I_{xx} & I_{xy} \\ I_{xy} & I_{yy} \end{bmatrix} \cdot \begin{bmatrix} I_{xx} & I_{xy} \\ I_{xy} & I_{yy} \end{bmatrix} = \begin{bmatrix} J_{xx} & J_{xy} \\ J_{xy} & J_{yy} \end{bmatrix}$$

where $$J_{xx} = I_{xx} \cdot I_{xx} + I_{xy} \cdot I_{xy}$$

$$J_{yy} = I_{yy} \cdot I_{yy} + I_{xy} \cdot I_{xy}$$

$$J_{xy} = (I_{xx} + I_{yy}) \cdot I_{xy}$$

In a further embodiment, a value of the FA measure is computed for each pixel. As previously was described, the Hessian matrix can be squared in order to assist in the calculation of the FA measure. Squaring the Hessian matrix has the following properties:

$$\mathrm{eig}(H)=(\lambda_1,\lambda_2) \Rightarrow \mathrm{eig}(H^2)=(\lambda_1^2,\lambda_2^2)$$

$$\mathrm{trace}(H)=I_{xx}+I_{yy}=\lambda_1+\lambda_2 \Rightarrow \mathrm{trace}(H^2)=J_{xx}+J_{yy}=\lambda_1^2+\lambda_2^2$$

$$\det(H)=I_{xx} \cdot I_{yy}-I_{xy}^2=\lambda_1 \cdot \lambda_2 \Rightarrow \det(H^2)=J_{xx} \cdot J_{yy}-J_{xy}^2=\lambda_1^2 \cdot \lambda_2^2$$

The trace and determinant of the squared Hessian matrix $H^2$ can be computed directly from the matrix elements $J_{xx}$, $J_{yy}$ and $J_{xy}$, as can be concluded from the above. Thus:

$$\frac{\mathrm{trace}(H^2) - 2 \cdot \sqrt{\det(H^2)}}{\mathrm{trace}(H^2) + \varepsilon} = \frac{\lambda_1^2 + \lambda_2^2 - 2 \cdot \lambda_1 \cdot \lambda_2}{\lambda_1^2 + \lambda_2^2 + \varepsilon} = \frac{(\lambda_1 - \lambda_2)^2}{\lambda_1^2 + \lambda_2^2 + \varepsilon} = FA^2$$

For each pixel in the captured image, the processing unit 103 computes the determinant det($H^2$) of the Hessian matrix and determines if the resulting value is less than or equal to zero; if that is the case, the processing unit 103 sets $FA^2$ for that particular pixel to zero.

Hence, the method according to an embodiment of the invention can advantageously determine whether the object represented by the captured image is a finger or not by evaluating the computed FA measure for each pixel.

Figure 6:
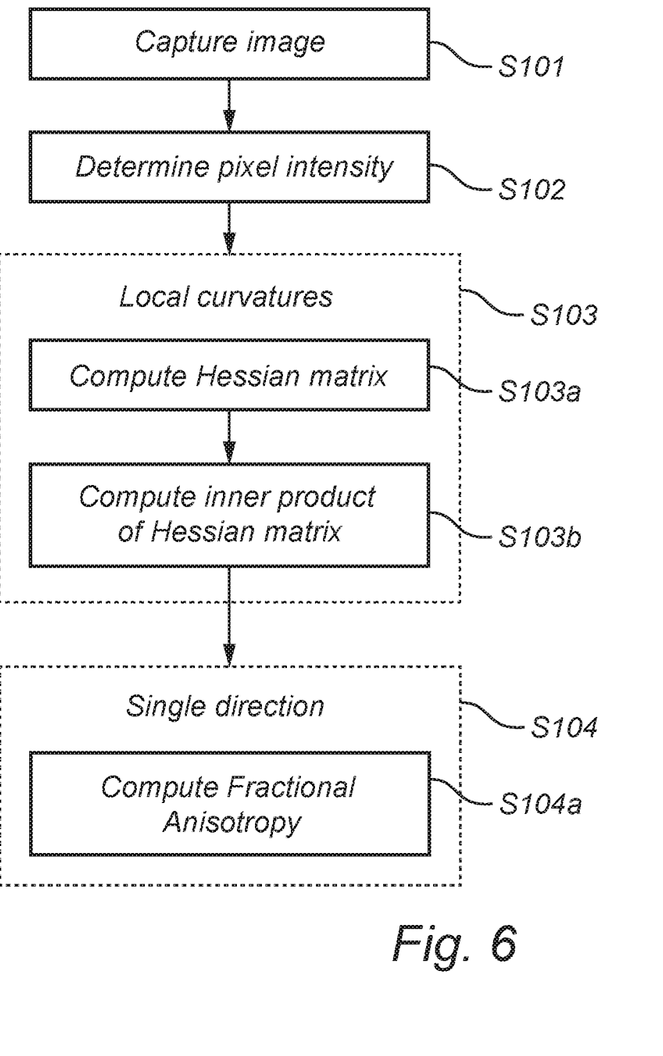
FIG. 6 shows a flowchart illustrating a method of determining if a finger contacts the fingerprint sensor according to another embodiment.

FIG. 6 illustrates a flowchart summarising some of the embodiments discussed so far.

In a first step S101, the fingerprint sensor 102 captures an image of an object contacting the sensor 102.

In a second step S102, the processing unit 103 determines, from the captured image, an intensity for a plurality of pixels of the captured image.

In a third step S103a, in order to estimate local curvatures of pixel intensity variation in the captured image, the processing unit 103 computes the Hessian matrix H, and thereafter computes the square of the Hessian matrix $H^2$ in step S103b.

Finally in step 104a, in order to determine from the estimated local curvatures whether local pixel intensity variation is dominated by a single direction, the processing unit 103 computes the FA measure using the eigenvalues of the computed Hessian matrix H, as has been mathematically described herein above.

If the FA measure is zero, the eigenvalues have the same magnitude, i.e. the local curvature of the pixel intensity is isotropical/circular, and the pixel in the captured image most likely does not represent a part of a fingerprint.

To the contrary, if the FA measure is close to one, one eigenvalue is much larger than the other, i.e. the local pixel intensity variation is dominated by a single direction, and there is strong evidence of a ridge or valley around that pixel in the captured image, whereby it advantageously can be concluded that the pixel in the captured image most likely does represent a part of a fingerprint.

In a further embodiment, in order to qualify whether the computed FA measure indicates a fingerprint or not, a fingerprint qualification score (FQS) is introduced. The FQS is computed as a linear combination of—e.g. the sum of—all FA measure values for all pixels normalized by the total number of pixels.

For convenience, the FQS can be scaled. The FQS is thus computed as the scaled (e.g. by 100) average of the FA measure across all pixels in the captured image:

$$FQS = \frac{100}{N_x \cdot N_y} \cdot \sum_{xy} FA_{xy}^2,$$

where $N_x$ and $N_y$ denote the dimension of the captured image, i.e. the total number of pixels in the x-direction and y-direction, respectively, of the image.

Figure 7:
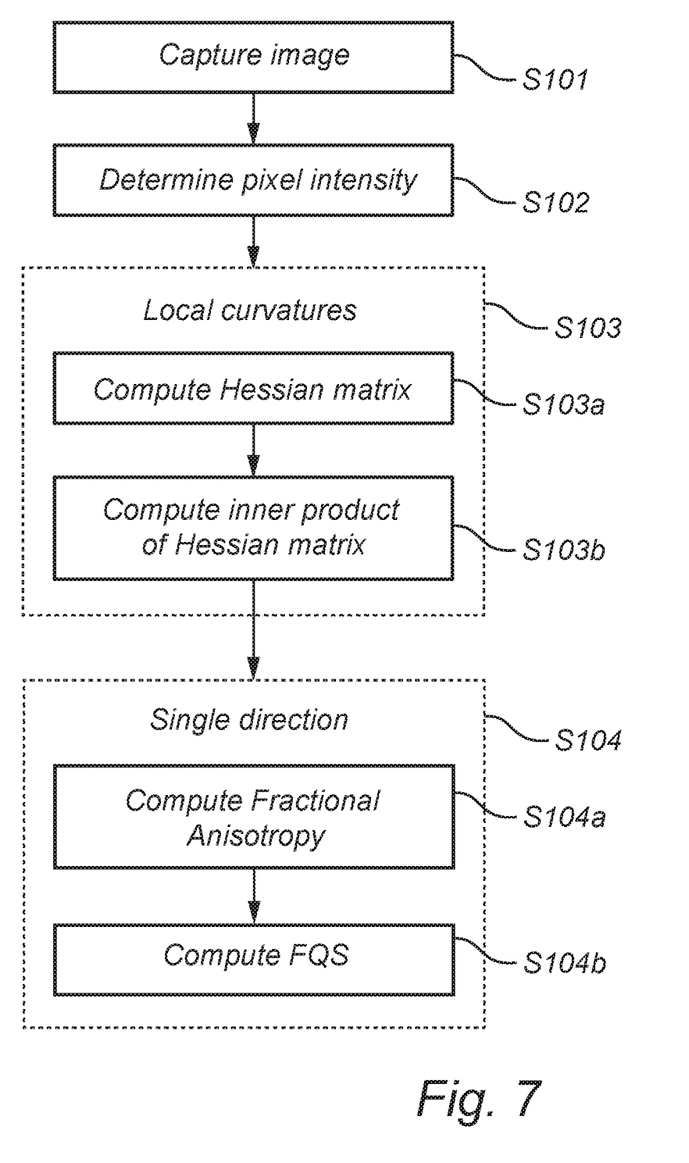
FIG. 7 shows a flowchart illustrating a method of determining if a finger contacts the fingerprint sensor according to yet an embodiment.

Hence, with reference to FIG. 7 showing a flowchart of the method including this embodiment; after having computed the FA measure, the processing unit 103 proceeds to computing the FQS according to the above.

Thereafter, in a further embodiment, the object represented in the captured image is advantageously considered to be a fingerprint if FQS>=T, where T is an appropriately selected threshold value, and accordingly a non-fingerprint if FQS<T.

With reference to the flowchart of FIG. 8, in still a further embodiment, prior to computation of the Hessian matrix H and subsequently the FA measure, the processing unit 103 performs downsampling of the captured image in step S102a, such as by a factor 2. The downsampling of step S102a may be performed using so called box downsampling.

This advantageously reduces the amount of pixels for which the FA measure must be calculated to ¼, drastically reducing the complexity. Such a downsampling is advantageous in situations where it does not have any significant impact on the ability to distinguish between fingerprints and non-fingerprints of the method according to the invention.

In yet a further embodiment, in order to advantageously reduce image noise which can cause instabilities when calculating the Hessian matrix H with second-order derivatives, the processing unit 103 performs in step S102b smoothing filtering of the captured image (downsampled or not).

This is performed by the processing unit 103 by convoluting the captured image with a filter $F_{smooth}$ that is a rough approximation of a Gaussian kernel:

$$F_{smooth} = \frac{1}{16}\begin{bmatrix} 1 & 2 & 1 \\ 2 & 4 & 2 \\ 1 & 2 & 1 \end{bmatrix} = \frac{1}{16}\begin{bmatrix} 1 \\ 2 \\ 1 \end{bmatrix} \cdot [1 \ 2 \ 1]$$

Algorithmically, this is implemented by first applying the filter [1 2 1] in the (horizontal) x-direction and then applying the filter $\frac{1}{16} \cdot [1 \ 2 \ 1]^T$ in the (vertical) y-direction.

Figure 8:
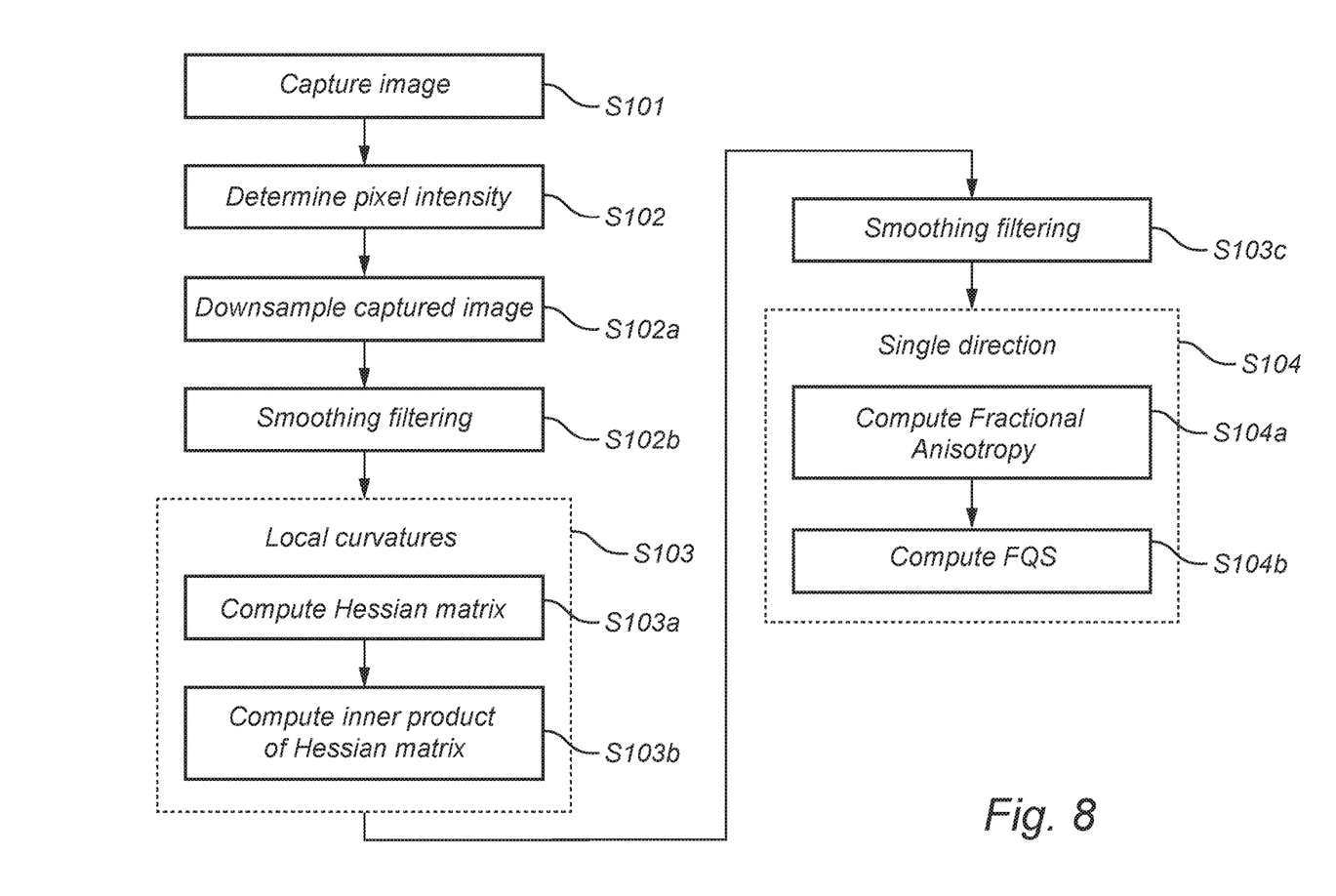
FIG. 8 shows a flowchart illustrating a method of determining if a finger contacts the fingerprint sensor according to still another embodiment.

With further reference to FIG. 8, the method then proceeds to compute the Hessian matrix H with the second-order derivatives of the pixel intensity in step S103a and performing the square of the Hessian matrix $H^2$ in step S103b.

Thereafter, in yet a further embodiment, before the FA measure is computed, the processing unit 103 performs a further smoothing filtering operation on the components of the squared Hessian matrix $H^2$ in step S103c in order to advantageously improve numerical stability and discriminative ability of the subsequently computed FQS.

This is performed by the processing unit 103 by constructing 3 'images' that contain the values of $J_{xx}$, $J_{yy}$ and $J_{xy}$ for each pixel, respectively. Each 'image' is then filtered by convolution with a filter $C_{smooth}$ that is a rough approximation to a 5×5 Gaussian kernel. In other words, for each pixel, each component of the squared Hessian matrix $H^2$ is convoluted with the filter $C_{smooth}$:

$$C_{smooth} = \frac{1}{64}\begin{bmatrix} 1 \\ 2 \\ 3 \\ 2 \\ 1 \end{bmatrix} \cdot [1 \ 2 \ 3 \ 2 \ 1]$$

Algorithmically, this is implemented by first applying the filter ⅛·[1 2 3 2 1] in the (horizontal) x-direction and then applying the filter ⅛·[1 2 3 2 1]$^T$ in the (vertical) y-direction.

Subsequently, the processing unit 103 proceeds to step 104a for computing the FA measure, and then computes the FQS in step S104b in order to determine whether the object on the fingerprint sensor 102 is a finger or not.

With reference again to FIG. 3, after it has been determined in step S104b that the captured image indeed represents a fingerprint, the processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

In contrast, should the processing unit 103 come to the conclusion that the image captured by the sensor 102 does not represent a fingerprint, the processing unit 103 will not start the process of performing fingerprint template matching, thereby avoiding unnecessary battery drainage.

In conclusion, the present invention provides a method performed by a fingerprint sensor of determining if a finger contacts the fingerprint sensor. Hence, the method advantageously distinguishes between sensor contact with a finger versus other items such as coins, keys, wallets, cloth, lint, etc., of a pocket or bag in which an electronic device being equipped with the fingerprint sensor is located. Non-fingerprint images can thus be rejected before a power-consuming fingerprint matching process is started.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. Method performed by a fingerprint sensing system of determining if a finger contacts a fingerprint sensor of the fingerprint sensing system, comprising:
capturing an image of an object contacting the fingerprint sensor;
determining an intensity for a plurality of pixels of the captured image;
computing, for each of said plurality of pixels of the captured image, a Hessian matrix where the components of the Hessian matrix consist of second-order derivatives of the pixel intensity in the captured image;
computing the square of the Hessian matrix;
computing a squared Fractional Anisotropy, FA, measure using eigenvalues of the computed squared Hessian matrix; and
determining from the squared FA measure if local pixel intensity variation is dominated by a single direction, in which case the object on the fingerprint sensor is considered to constitute a finger.

2. The method of claim 1, wherein the components of the Hessian matrix are computed by convolving the captured image with a first filter in an x-direction, convolving the captured image with a second filter in a y-direction, and convolving the captured image with a third filter in the x-direction and then convolving the result of the convolution with the third filter with a fourth filter in the y-direction.

3. The method of claim 1, further comprising:
computing trace and determinant of the Hessian matrix to derive its eigenvalues.

4. The method of claim 1, further comprising:
computing a fingerprint qualification score as a combination of all the FA measure values for said plurality of pixels normalized by the number of said plurality of pixels.

5. The method of claim 4, further comprising:
comparing the computed fingerprint qualification score to a threshold value, wherein the local pixel intensity variation is considered to be dominated by a single direction if the fingerprint qualification score exceeds the threshold value.

6. The method of claim 1, further comprising:
downsampling the captured image.

7. The method of claim 1, further comprising:
performing smoothing filtering of the captured image.

8. The method of claim 1, further comprising:
performing smoothing filtering of each component of the square of the Hessian matrix.

9. The method of claim 1, further comprising:
comparing a fingerprint of the captured image of the finger with one or more authorised pre-stored fingerprint templates; and
authenticating a user to which the finger belongs if the fingerprint of the captured image is considered to match one or more of the authorised pre-stored fingerprint templates.

10. Fingerprint sensing system comprising a fingerprint sensor and a processing unit, the fingerprint sensing system being configured to determine if a finger contacts the fingerprint sensor of the fingerprint sensing system,
the fingerprint sensor being configured to:
capture an image of an object contacting the fingerprint sensor; and
the processing unit being configured to:
determine an intensity for a plurality of pixels of the captured image;
compute, for each of said plurality of pixels of the captured image, a Hessian matrix where the components of the Hessian matrix consist of second-order derivatives of the pixel intensity in the captured image;
compute the square of the Hessian matrix;
compute a squared Fractional Anisotropy, FA, measure using eigenvalues of the computed Hessian matrix; and
determine from the squared FA measure if local pixel intensity variation is dominated by a single direction, in which case the object on the fingerprint sensor is considered to constitute a finger.

11. The fingerprint sensing system of claim 10, wherein the processing unit further is configured to compute the components of the Hessian matrix by convolving the captured image with a first filter in an x-direction, convolving the captured image with a second filter in a y-direction, and convolving the captured image with a third filter in the x-direction and then convolving the result of the convolution with the third filter with a fourth filter in the y-direction.

12. The fingerprint sensing system of claim 10, wherein the processing unit further is configured to:
compute trace and determinant of the Hessian matrix to derive its eigenvalues.

13. The fingerprint sensing system of claim 10, wherein the processing unit further is configured to:
compute a fingerprint qualification score as a linear combination of all the FA measure values for said plurality of pixels normalized by the number of said plurality of pixels.

14. The fingerprint sensing system of claim 13, wherein the processing unit further is configured to:
compare the computed fingerprint qualification score to a threshold value, wherein the local pixel intensity variation is considered to be dominated by a single direction if the fingerprint qualification score exceeds the threshold value.

15. The fingerprint sensing system of claim 10, wherein the processing unit further is configured to:
downsample the captured image.

16. The fingerprint sensing system of claim 10, wherein the processing unit further is configured to:
perform smoothing filtering of the captured image.

17. The fingerprint sensing system of claim 10, wherein the processing unit further is configured to:
perform smoothing filtering of each component of the square of the Hessian matrix.

18. The fingerprint sensing system of claim 10, further comprising a memory configured to store authorised fingerprint templates, the processing unit being configured to:
compare a fingerprint of the captured image of the finger with one or more of the authorised fingerprint templates stored in the memory; and
authenticate a user to which the finger belongs if the fingerprint of the captured image is considered to match one or more of the authorised fingerprint templates.

19. An electronic device comprising the fingerprint sensing system of claim 10, the electronic device being configured to perform at least one action upon authentication of the user.

20. A computer program product comprising a non-transitory computer readable medium storing computer-executable instructions that, when executed by one or more processors in a fingerprint sensing system, cause the fingerprint sensing system to perform the method of claim 1.

* * * * *